(12) United States Patent
Sarid

(10) Patent No.: US 10,592,319 B2
(45) Date of Patent: *Mar. 17, 2020

(54) API NOTEBOOK TOOL

(71) Applicant: MULESOFT, LLC, San Francisco, CA (US)

(72) Inventor: Uri Sarid, Oakland, CA (US)

(73) Assignee: MuleSoft, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,457

(22) Filed: Feb. 22, 2019

(65) Prior Publication Data
US 2019/0188062 A1 Jun. 20, 2019

Related U.S. Application Data

(63) Continuation of application No. 15/226,772, filed on Aug. 2, 2016, now Pat. No. 10,216,554, which is a continuation of application No. 14/301,193, filed on Jun. 10, 2014, now Pat. No. 9,442,700.

(60) Provisional application No. 61/884,883, filed on Sep. 30, 2013.

(51) Int. Cl.
*G06F 9/54* (2006.01)
*G06F 9/451* (2018.01)
*G06F 8/30* (2018.01)
*G06F 8/36* (2018.01)

(52) U.S. Cl.
CPC ........... *G06F 9/547* (2013.01); *G06F 8/30* (2013.01); *G06F 9/451* (2018.02); *G06F 8/36* (2013.01)

(58) Field of Classification Search
None
See application file for complete search history.

(56) References Cited

U.S. PATENT DOCUMENTS

| | | |
|---|---|---|
| 6,826,683 B1 | 11/2004 | Suermondt et al. |
| 6,931,599 B1 | 8/2005 | Korenshtein |
| 7,117,243 B2 | 10/2006 | Peart |
| 8,893,077 B1 | 11/2014 | Aiuto et al. |
| 9,652,769 B1 | 5/2017 | Golin |

(Continued)

FOREIGN PATENT DOCUMENTS

WO WO-0171489 A1 9/2001

OTHER PUBLICATIONS

IP[y]: IPython Interactive Computing, The IPython Notebook, retrieved on [Sep. 22, 2013], downloaded from Internet Archive Way Back Machine, Retrieved From the Internet: (https://web.archive_org/web/20130922064208/http:/ipython.org/notebook.html).

(Continued)

*Primary Examiner* — Tuan C Dao
*Assistant Examiner* — William C Wood
(74) *Attorney, Agent, or Firm* — Sterne, Kessler, Goldstein & Fox P.L.L.C.

(57) ABSTRACT

Techniques for an application programming interface (API) notebook tool are disclosed. In some implementations, an API notebook is a tool, framework, and ecosystem that enables easy exploration of services that expose APIs, creation and documentation of examples, use cases and workflows, and publishing and collaboration of APIs. In some embodiments, systems, processes, and computer program products for an API notebook tool include receiving a request for a client for calling an API for a service, and dynamically generating the client for the API for the service.

20 Claims, 10 Drawing Sheets

(56) References Cited

U.S. PATENT DOCUMENTS

| | | |
|---|---|---|
| 2002/0129330 A1 | 9/2002 | Shiu |
| 2009/0199133 A1 | 8/2009 | Deutsch et al. |
| 2010/0083287 A1 | 4/2010 | Maximilien et al. |
| 2011/0313932 A1 | 12/2011 | Bhandar et al. |
| 2012/0159317 A1 | 6/2012 | Di et al. |
| 2013/0212165 A1 | 8/2013 | Vermeulen et al. |
| 2013/0238572 A1 | 9/2013 | Prahlad et al. |
| 2014/0122028 A1 | 5/2014 | Aberg |
| 2014/0289702 A1 | 9/2014 | McMahon et al. |

OTHER PUBLICATIONS

Wolfram Mathematica: Technical Computing Software—Taking You from Idea to Solution, Wolfram Mathematica 9, retrieved on [Sep. 21, 2013], downloaded from Internet Archive Way Back Machine, (https://web.archive.org/web/20130921072651/http:/www.wolfram.com/mathematics/).

| Here is a service, with an API, offering music from all over the world:. After loading the API description, described in a RAML file, the notebook has the information it needs to generate a custom DSL client for this API, and offer auto-completion hinting to help use this API. | documentation cell |
|---|---|
| 1 Music = load('http://worldmusic.com/api/raml') | code cell |
| $0= ▶ { "songs": [object Object] } | results cell |

With the API description loaded, we can easily load a subset of songs. Note that once Music. is typed, the notebook offers to auto-complete songs because that's a root resource of the API.  ← results inspector

```
2 mySongs = Music.songs.get({genre: 'reggae'})
$1= ▼ { "status": [object Object], "headers": [object Array], "body": [object Array],
       "meta": [object Obje...
    ▶ status: { "200": "OK" }
    ▶ headers: [[object Object], [object Object]]
    ▼ body: [[object Object], [object Object], [object Object]]
        ▶ 0: { "title": "By The Rivers Of Babylon", "artist": "Boney M" }
        ▶ 1: { "title": "Red, Red Wine", "artist": "Bob Marley" }
        ▶ 2: { "title": "Wild Gilbert", "artist": "Lovindeer" }
          length: 3
    ▶ meta: { "baseUri": "http://...", "path": "/songs", "method": "get" }

3 mySong = mySongs.body[0]
$2= ▼ { "title": "By The Rivers Of Babylon", "artist": "Boney M" }
       title: "By The Rivers Of Babylon"
       artist: "Boney M"
```

FIG. 4

Here is a service, with an API, offering music from all over the world:.
After loading the API description, described in a RAML file,
the notebook has the information it needs to generate a custom DSL
client for this API, and offer auto-completion hinting to help use this API.

1 | Music = load('http://worldmusic.com/api/raml')

$0= ▶ { "songs": [object Object] }

With the API description loaded, we can easily load a subset of songs.
Note that once Music is typed, the notebook offers to
auto-complete songs because that's a root resource of the API.

2 | mySongs = Music.songs.get[{genre: 'reggae'}]

$1= ▼ { "status": [object Object], "headers": [object Array], "body": [object Array],
    "meta": [obje...
   ▶ status: { "200": "OK" }
   ▶ headers: [[object Object], [object Object]]
   ▼ body: [[object Object], [object Object], [object Object]]
       ▶ 0: { "title": "By The Rivers Of Babylon", "artist": "Boney M" }
       ▶ 1: { "title": "Red, Red Wine", "artist": "Bob Marley" }
       ▶ 2: { "title": "Wild Gilbert", "artist": "Lovindeer" }
         length: 3
   ▶ meta: { "baseUri": "http://...", "path": "/songs", "method": "get" }

3 | mySong = mySongs.body[0]

$2= ▼ { "title": "By The Rivers Of Babylon", "artist": "Boney M" }
     title: "By The Rivers Of Babylon"
     artist: "Boney M"

I can now mash up this API with the Facebook API, after I load the Facebook API
description from a RAML file hosted somewhere.

4 | Facebook = load('http://apihub.com/facebook/raml')

$3= ▶ { "userId": [object Function] }

Now we can take the song info I got from the World Music API calls
and use it to post a message through the Facebook API:

5 | Facebook.userId('sarid').feed.post({message: 'I like ' + mySong.title})

$4= ▼ { "status": [object Object], "headers": [object Array], "body": "Message 'I like By The River..
    ▶ status: { "200": "OK" }
    ▶ headers: [[object Object], [object Object]]
       body: "Message 'I like By The Rivers Of Babylon' posted to wall"
    ▶ meta: { "baseUri": "http://...", "path": "/sarid/feed", "method": "post" }

FIG. 5

| 1 | // Read about the Instagram API at http://api-portal.anypoint.mulesoft.com/instagram/api/instagram-api |
|---|---|
| 2 | API.createClient('instagramApi', 'http://api-portal.anypoint.mulesoft.com/instagram/api/instagram-api/instagram-api.raml'); |

$0= "Create a new code cell and type 'instagramApi.' to explore this API."

---O---

Instagram requires authentication, so we'll need to allow it access to our account:

---O---

| 3 | API.authenticate (instagramApi) ; |
|---|---|

$1= ▼object {"scope": "basic comments relationships likes",
"accessToken": "▭"}
   accessToken: "▭"
   scope: "basic comments relationships likes"

---O---

| 4 | response = instagramApi.geographies |
|---|---|

| geographies | object |
|---|---|
| locations | object |
| media | object |
| oembed | object |
| p | object |
| tags | object |
| users | object |

There's a lot of informati[...], and status
You can explore the cont[...] with the arrow in the inspector.
We're most interested in [...] the image information is.
Let's capture that in a va[...]

| 5 | images = response.body.data; |
|---|---|

```
1 // Read about the Instagram API at http://api-portal.anypoint.mulesoft.com/instagram/
  api/instagram-api
2 API.createClient('instagramApi', 'http://api-portal.anypoint.mulesoft.com/instagram/
  api/instagram-api/instagram-api.raml');
```
$0= "Create a new code cell and type 'instagramApi.' to explore this API."

Instagram requires authentication, so we'll need to allow it access to our account:

```
3 API.authenticate (instagramApi) ;
```
$1= ▼ object {"scope": "basic comments relationships likes",
"accessToken": "[          ]"}
  accessToken: "[          ]"
  scope: "basic comments relationships likes"

```
4 response = instagramApi.tags.tagName(       ⌒702
  tagName (tagName)
  String
  Name of tag.
```

There's a lot of information there... body, headers, and status.
You can explore the contents of each by opening it with the arrow in the inspector.
We're most interested in body.data - -that's where the image information is.
Let's capture that in a variable:

```
5 images = response.body.data;
```

FIG. 7

| 1 | // Read about the Instagram API at http://api-portal.anypoint.mulesoft.com/instagram/api/instagram-api |
| 2 | API.createClient('instagramApi', 'http://api-portal.anypoint.mulesoft.com/instagram/api/instagram-api/instagram-api.raml'); |

$0= "Create a new code cell and type 'instagramApi.' to explore this API."

Instagram requires authentication, so we'll need to allow it access to our account:

| 3 | API.authenticate (instagramApi) ; |

$1= ▼ object {"scope": "basic comments relationships likes",
"accessToken": "▭"}
  accessToken: "▭"
  scope: "basic comments relationships likes"

| 4 | response = instagramApi.tags.tagName ('kittens').media.recent.get() |

$2= ▼ object {"body": object, "status": 200, "headers": object}
  ▶ body: object
  ▶ headers: object
    status: 200

―802

There's a lot of information there... [body], [headers], and [status].
You can explore the contents of each by opening it with the arrow in the inspector.
We're most interested in [body.data] - -that's where the image information is.
Let's capture that in a variable:

FIG. 8

API NOTEBOOK TOOL

CROSS REFERENCE TO RELATED APPLICATIONS

This application is a continuation of U.S. patent application Ser. No. 15/226,772, filed Aug. 2, 2016, which is a continuation of U.S. patent application Ser. No. 14/301,193, filed Jun. 10, 2014, now U.S. Pat. No. 9,442,700, which claims the benefit of U.S. Provisional Application No. 61/884,883 filed Sep. 30, 2013, all of which are incorporated herein by reference in their entirety.

BACKGROUND OF THE INVENTION

Computers are typically programmed using computer programming languages. In computer programming, an application programming interface (API) generally specifies how software components can interact with each other. For example, an API can be provided for an application (e.g., executed on a client computing device) that can interact with a service, such as a web-based service (e.g., by calling the API to interact with the service, such as by performing a remote call to an API for interacting with a web-based service).

BRIEF DESCRIPTION OF THE DRAWINGS

Various embodiments of the invention are disclosed in the following detailed description and the accompanying drawings.

FIG. 4 is an example screen diagram illustrating a graphical user interface (GUI) of an interface of an API notebook tool in accordance with some embodiments.

FIG. 5 is another example screen diagram illustrating a graphical user interface (GUI) of an interface of an API notebook tool in accordance with some embodiments.

FIG. 6 is another example screen diagram illustrating a graphical user interface (GUI) of an interface of an API notebook tool in accordance with some embodiments.

FIG. 7 is another example screen diagram illustrating a graphical user interface (GUI) of an interface of an API notebook tool in accordance with some embodiments.

FIG. 8 is another example screen diagram illustrating a graphical user interface (GUI) of an interface of an API notebook tool in accordance with some embodiments.

DETAILED DESCRIPTION

Figure 1:
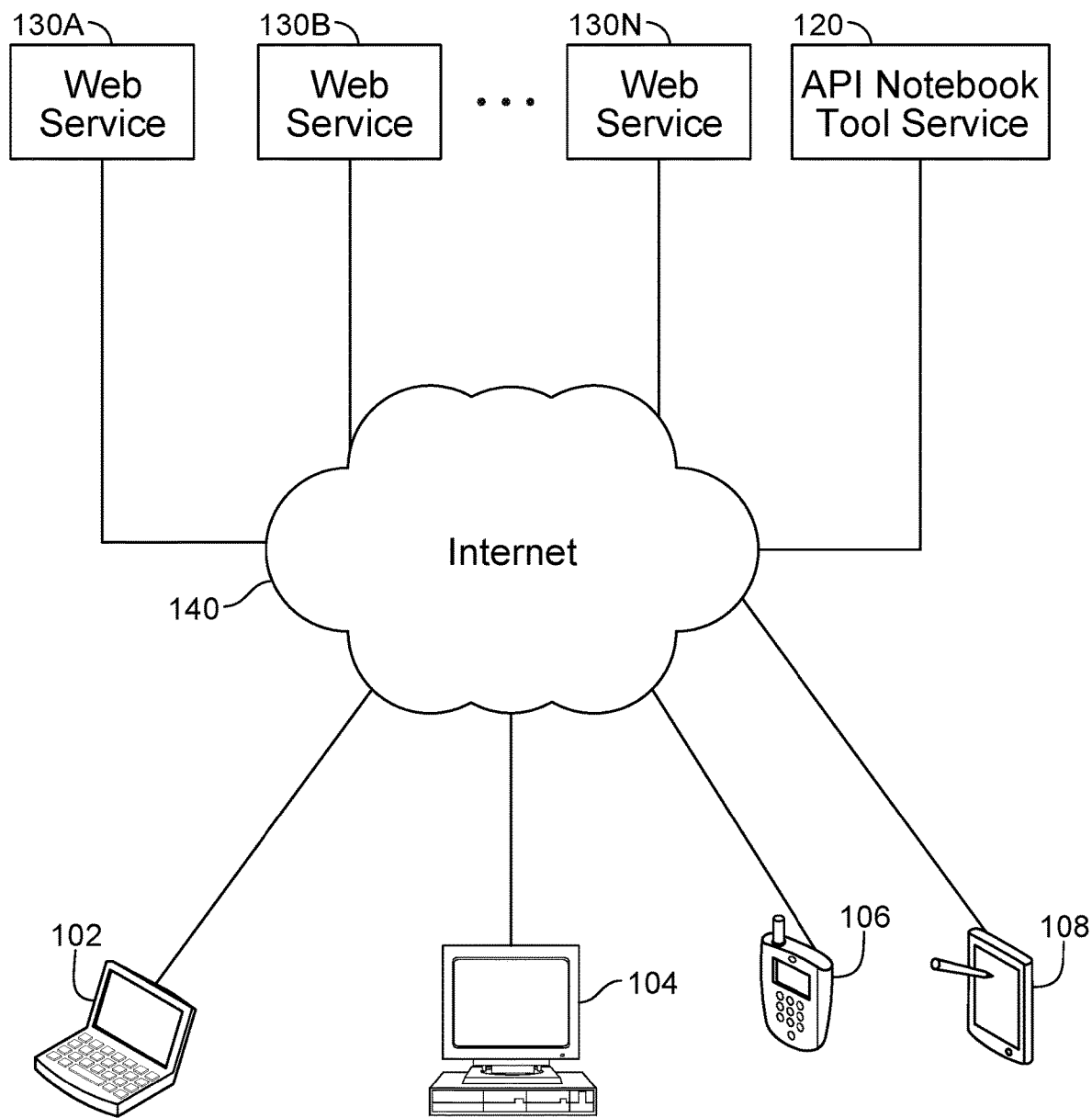
FIG. 1 is a block diagram illustrating an overview of an architecture of a system for providing an API notebook tool in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A significant number of different application programming interfaces (APIs) exist. For example, various different APIs can be provided for an application (e.g., executed on a client computing device) that can interact with a service. For example, an application executed on a client (e.g., a smart phone, smart watch, tablet, laptop, or other client computing device) call interact with a web-based service by calling the API to interact with the service, such as by performing a remote call to an API for interacting with a web-based service.

An API can be provided in the form of a library that includes specifications for routines, data structures, object classes, and variables. In some cases, such as for representational state transfer (REST) services, an API (e.g., a REST API or RESTful API, or an API that embodies some RESTful practices) is a specification of remote calls exposed to the API consumers (e.g., applications executed on a client computing device can be consumers of a REST API by performing remote calls to the REST API). REST services generally refer to a software architecture for coordinating components, connectors, and/or other elements, within a distributed system (e.g., a distributed hypermedia system).

An API specification can be defined in various forms, including an International Standard (e.g., POSIX), vendor documentation (e.g., Microsoft Windows API), the libraries of a programming language (e.g., Standard Template Library in C++ or Java API), and an open practically-RESTful API (e.g., a web API that can be provided as an open, standardized, or otherwise publicly available API for applications to consume the web API, such as a REST API for a web service, such as Amazon Web Services®, Facebook®, Salesforce®, Twitter®, and/or other web services).

However, application developers need to call a variety of different and often new or evolving APIs to develop an application that interacts with one or more remote services (e.g., web services or other cloud-based, remote services).

Thus, there is a need to facilitate application development by improving client API development.

Accordingly, techniques for an application programming interface (API) notebook tool are disclosed. In some implementations, an API notebook is a tool, framework, and ecosystem that enables easy exploration of services that expose APIs, creation and documentation of examples, use cases and workflows, and publishing and collaboration of APIs.

In some embodiments, systems, processes, and computer program products for an API notebook tool include receiving a request for a client for calling an API (e.g., a representational state transfer (REST) API) for a service (e.g., a web service), and dynamically generating the client for calling the API for the service. For example, the client for calling the API for the service can be dynamically generated based on an API specification. In an example implementation, the client for calling the API for the service is dynamically generated using an API client generation engine (e.g., using a JavaScript-based Domain Specific Language (DSL) for the API).

In some embodiments, systems, processes, and computer program products for an API notebook tool further include converting the API into an object model stored as a note in a data store. In an example use case scenario, the client, which can be generated based on the library for the API specification language, can then be embedded into a mobile client application that interacts with the web service by calling the API.

In some implementations, the API notebook tool can be provided as a cloud-based API notebook tool and/or as a plug-in for existing clients to facilitate dynamically generating clients for calling APIs for services based on an API specification.

In some embodiments, systems, processes, and computer program products for an API notebook tool include receiving a request for a client for calling an API for a service, and generating help information associated with calling the API for the service. In some embodiments, systems, processes, and computer program products for an API notebook tool further include automatically suggesting API call data to provide the help information associated with using the API for the service.

In some implementations, the API notebook tool can be provided as a cloud-based API notebook tool and/or as a plug-in for existing clients to facilitate automated help information associated with the API. For example, providing automated help information associated with the API can include providing automatically suggested data to complete an API call (e.g., an automated complete form of help information), which can be determined based on one or more of the following: most popular and/or most frequently used features of the API to prioritize, which users have which access to features of the API and inform users about restrictions on the API, automatically suggesting prerequisite action (e.g., in order to authenticate which method to call to get data, such as obtaining credit card data before posting an order using the API), etc. As another example, providing automated help information associated with the API can include providing examples to users of API usage insert snippets (e.g., example snippets of other users' business logic to present as examples). As yet another example, providing automated help information associated with the API can include providing a template (e.g., scaffolding) of an application based on the note.

For example, the API notebook tool can be used to facilitate integration of client applications with Software As A Service (SAAS) and other online services (e.g., web services or other cloud services), which have, for example, interfaces, such as public or private APIs that are exposed for applications to interact with such online services. The API notebook tool can improve and ease development of applications that can interact with such online services by calling their respective APIs by dynamically generating client code for calling APIs for services, by generating help information for calling APIs for services (e.g., suggesting API calls, parameters, prerequisite calls, and/or other helpful suggestions or other information provided to a developer for application development that is calling such APIs), and/or by providing example and template client code for calling APIs for services.

As an example use case scenario, assume that a developer is coding (e.g., developing a program for) a mobile application (app) that shows sales persons of an entity, ACME Inc., various products. The mobile application communicates with a product catalog for ACME Inc. and possibly other services. In this example, the mobile application can communicate with the product catalog by calling an API. Assume that the mobile application also communicates with an ordering service for ACME Inc. by calling another API. Accordingly, various aspects of API development and integration are required in order to develop this mobile application to properly communicate with the product catalog for ACME Inc. and the ordering service for ACME Inc. using these different APIs.

For instance, such API development and integration can include one or more of the following: API design and definition, API integration, API management (e.g., who has access, what is the scope of such access, etc.), API analytics, and API engagement. As further described herein, an API notebook is provided that can facilitate with each of these aspects for integration services with APIs.

FIG. 1 is a block diagram illustrating an overview of an architecture of a system for providing an API notebook tool in accordance with some embodiments.

As shown, various user devices, such as a laptop computer 102, a desktop computer 104, a smart phone 106, and a tablet 108 (e.g., and/or various other types of client computing devices) that can execute an application, which can interact with one or more cloud-based services, are in communication with Internet 140 to access various web services provided by different servers or appliances 130A, 130B, . . . , 130N (e.g., which can each serve one or more web services or other cloud-based services).

For example, web service providers or other cloud service providers (e.g., provided using web servers, application (app) servers, or other servers or appliances) can provide APIs for interacting with their services. These APIs, such as REST APIs or other APIs, can be published and defined in a specification that can be processed by an API Notebook tool service 120 (e.g., which can be provided as a cloud-based API notebook tool service). In some implementations, the API notebook tool service provides various techniques for facilitating client generation and/or help for calling APIs for interacting with cloud/web service providers, as disclosed herein.

In some cases, APIs can include public or otherwise open APIs, standardized APIs, and/or proprietary APIs that are accessible via a license or otherwise publicly available. A specification of such APIs can be provided in one or more formats that can be parsed, processed, and used for automated and dynamic API client generation using the API notebook tool service that can interpret and process the API specification. For instance, the specification of a given API can be provided by the entity or programmer that defined and created the API and/or by a third party, such as another API developer or programmer (e.g., at the request of the API developer or by their own initiative). In some cases, the specification for an API can be provided via a community of developers or programmers. Example API specification formats include the RESTful API Modeling Language™ (RAML™) specification (available at http://ram1.org/spec.html), Apiary's API Blueprint Specification (available at https://github.com/apiaryio/api-blueprint/blob/master/API %20Blueprint %20Specification.md), Reverb's Swagger Specification (available at https://github.com/wordnik/swagger-spec), W3C's Web Application Description Language (WADL) standard (available at http://www.w3.org/Submission/wadl/), or another format or modeling language that can be used for providing an API specification to generally define an API's endpoints and expected parameters, which can be consumed and processed by the API notebook tool as further described herein.

In some implementations, the API notebook tool service can be implemented on a computer server or appliance (e.g., or using a set of computer servers and/or appliances) or as a cloud service, such as using Amazon Web Services or other cloud service providers. For example, API notebook tool service 120 can be implemented on one or more computer servers or appliance devices or can be implemented as a cloud service, such as using Amazon Web Services or another cloud service provider for cloud-based computing and storage services.

As an example, the API notebook allows for efficient testing of various different use cases for an API. Testing an API allows developers/designers of a new API to determine how the API will likely be consumed to design a better API. Testing an API also allows for users of an API to better capture their use cases for calling the API and testing their development to better discover the API (e.g., using scripts before coding in an application, such as the above described mobile application and/or other applications). For instance, the API may allow requests to request a user with certain parameters by making an API call in the form of GET/users/Alice to perform a user lookup operation, which can return various data (e.g., account number; status: active; level: manager; and/or other data). By scripting a test of this API call, it becomes apparent that before performing a post of orders for the user, in this example, the user is Alice, the credit card information for Alice would also be required. The request for the credit card information can be implemented by adding an API call in the form of GET/users/Alice/credit_card before performing the API call to POST/orders. Thus, as apparent from this basic example, the API notebook facilitates design by API designers and/or developers/consumers of the API by discovering, capturing, and testing various use cases for the API.

As another example, a developer can use the API notebook tool to automatically generate clients for particular use cases for interacting with an API. For instance, a developer can use the API notebook tool to discover the Instagram API and Twitter API. By using the API tool, a developer can discover different aspects of the Instagram API to post the most popular photo posting on Instagram and return the most popular Twitter tweet, which can be implemented as a script that can output what's hot on Instagram and Twitter by mashing together these API calls in this script.

Below is an example of a snippet of a script that mashes together a use of these two different APIs for Instagram and Twitter to post the most popular photo posting on Instagram and return the most popular Twitter tweet.

```
// Read about the Instagram API at http://api-portal.anypoint.mulesoft.com/instagram/api/instagram-api
API.createClient('instagramApi', 'http://api-portal.anypoint.mulesoft.com/instagram/api/instagram-api/instagram-api.raml');
API.authenticate(instagramApi)
mostPopularPicture = instagramApi.media.popular.get( ).body.data[0].link
// Read about the Twitter REST API at http://api-portal.anypoint.mulesoft.com/twitter/api/twitter-rest-api
API.createClient('twitterRestApi', 'http://api-portal.anypoint.mulesoft.com/twitter/api/twitter-rest-api/twitter-rest-api.raml');
API.authenticate(twitterRestApi)
twitterRestApi.statuses.update.json.post({status: 'The most popular instagram picture now is: ' + mostPopularPicture})
```

This example illustrates how the API notebook tool allows developers to discover and test various use cases for implementing applications that call such public APIs, test different use cases, discover, and review API documentation. In the API designer scenario, this allows the API designer to validate the API for these test cases. In the API consumer scenario, this allows the developer to validate their implementations and understandings of how to utilize the API for these test cases and to also go back to such scripts when later implementing their product to see how they call and interact with that API based on these tested scripts—generating clients automatically and capturing and sharing use cases.

As yet another example, these scripts can be shared in a data store, such as GitHub or another web hosting service or shared data repository, to share various scripts that call and implement such APIs (e.g., public or open APIs), to allow other developers to view those scripts as examples or as templates for usage in their development and discovery efforts. In some cases, a user authentication for an API call (e.g., a Twitter REST API, Instagram REST API, or other API that requires user authentication) can be customized for each user. Thus, this provides an efficient mechanism for providing examples of how to use such APIs and to test and view various use case scenarios for using such APIs for these services that can be shared with consumers/developers who will consume this API in their applications and shared between developers and/or from API designers with developers. These example/shared scripts can also become part of the documentation that is useful for such APIs. In some cases, these scripts/automatically generated clients can be shared via link, emailed, shared in a collaboration platform such as GitHub and/or other collaborative data repositories, posted on a web site, or shared using other approaches. This also then allows API designers to engage with developers who consume their API(s), see examples of how developers are consuming their API(s), and receive feedback from developers who are consuming their API(s).

As such, an API notebook tool is disclosed. In some implementations, an API notebook is a tool, framework, and ecosystem that enables easy exploration of services that expose APIs, creation and documentation of examples, use cases and workflows (e.g., a sequence of calls to an API(s) with some logic), and publishing and collaboration on them. For example, the API notebook can be executed on a processor to perform such functions as further described below with respect to FIG. 2.

Figure 2:
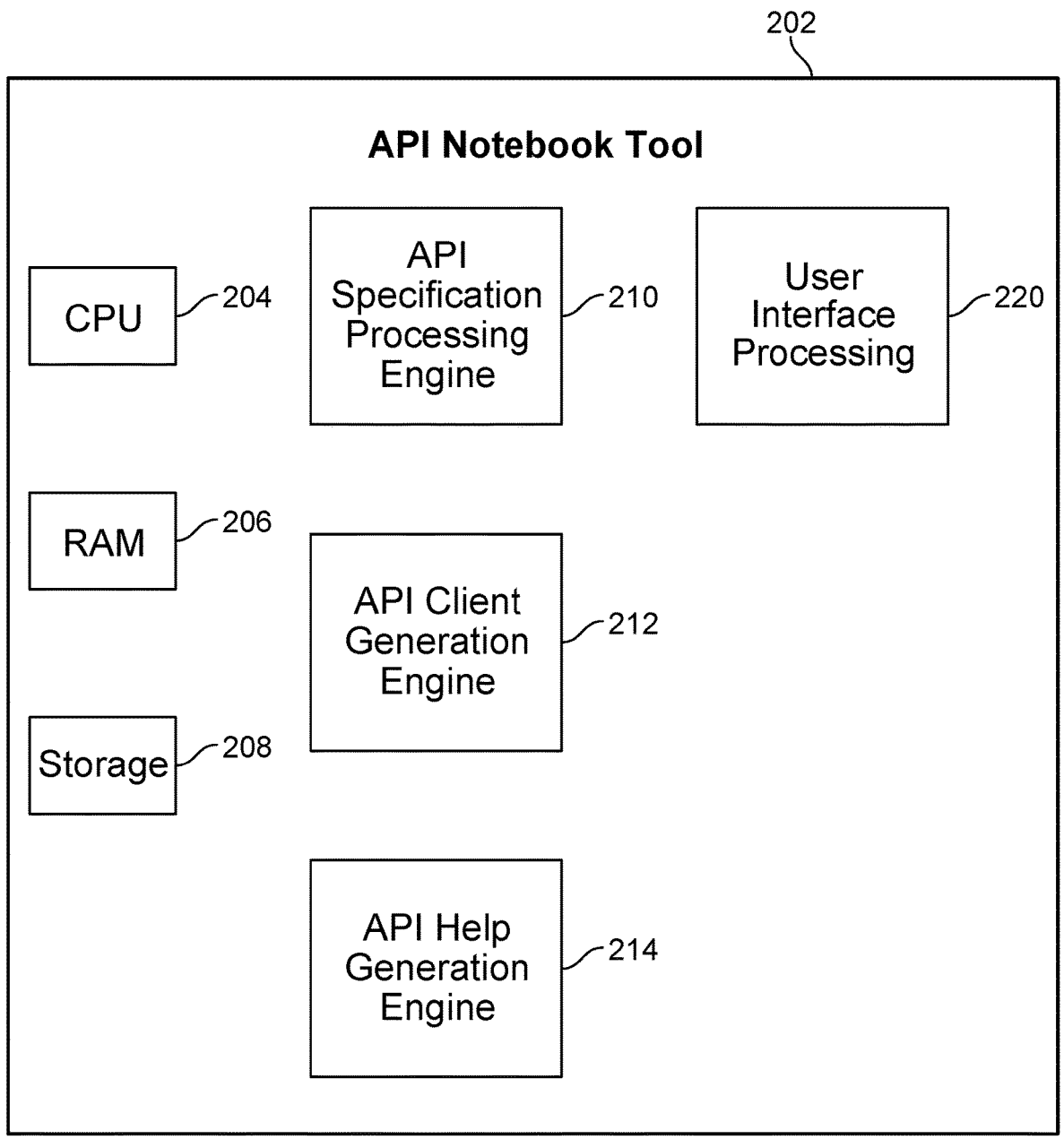
FIG. 2 is a functional block diagram illustrating an API notebook tool in accordance with some embodiments.

FIG. 2 is a functional block diagram illustrating an API notebook tool in accordance with some embodiments.

As shown, an API notebook tool 202 includes a CPU 204, a RAM 206, and a data storage 208. For example, API notebook tool 202 can provide an implementation of API notebook tool 120 as shown in FIG. 1.

As also shown in FIG. 2, API notebook tool 202 includes an API specification processing engine 210 (e.g., to parse and interpret an API specification, as further described herein), an API client generation engine 212 (e.g., to dynamically generate API clients based on the API specification and a request for a client for calling an API for a service, as further described herein), an API help generation engine 214 (e.g., to generate help API clients based on the API specification and a request for a client for calling an API for a service), and a user interface processing component 220 (e.g., for processing user input for user requests submitted to the API notebook tool, for generating user output in response to the user requests, and/or for processing various configuration input and/or user authorization verifications, as further described herein). The processing performed by each of these components is further described below. In some implementations, one or more of these functions can be performed by another device or function such that the API specification processing and/or the user interface processing can be performed using another device or function, which can provide respective input to the API notebook tool. As another example implementation, various components can be implemented as a common component, such as the API client generation engine that can be implemented to also perform the API specification processing.

In some implementations, API notebook tool 202 can implement the API notebook service 120 described above with respect to FIG. 1. For example, a user request for a client for calling an API for a service can be processed using CPU 204 and RAM 206 to dynamically generate the client for calling the API for the service that can be stored in storage 208 using API specification processing engine 210 and API client generation engine 212, and communicated to the user via user interface processing 220 (e.g., presented as output to a user on the user's client device, such as via a web browser executed on a smart phone, laptop, computer, or other computing device). As another example, a user request for a client for providing help information for using an API for a service can be processed using CPU 204 and RAM 206 to generate the help information for calling the API for the service that can be stored in storage 208 using API specification processing engine 210 and API help generation engine 214 and communicated to the user via user interface processing 220 (e.g., presented as output to a user on the user's client device, such as via a web browser executed on a smart phone, laptop, computer, or other computing device).

As further described below, various API notebook tool implemented techniques can be used for facilitating API client generation, help for API client generation, and/or various other techniques to facilitate application development calling APIs for cloud-based or other remote services.

Figure 3:
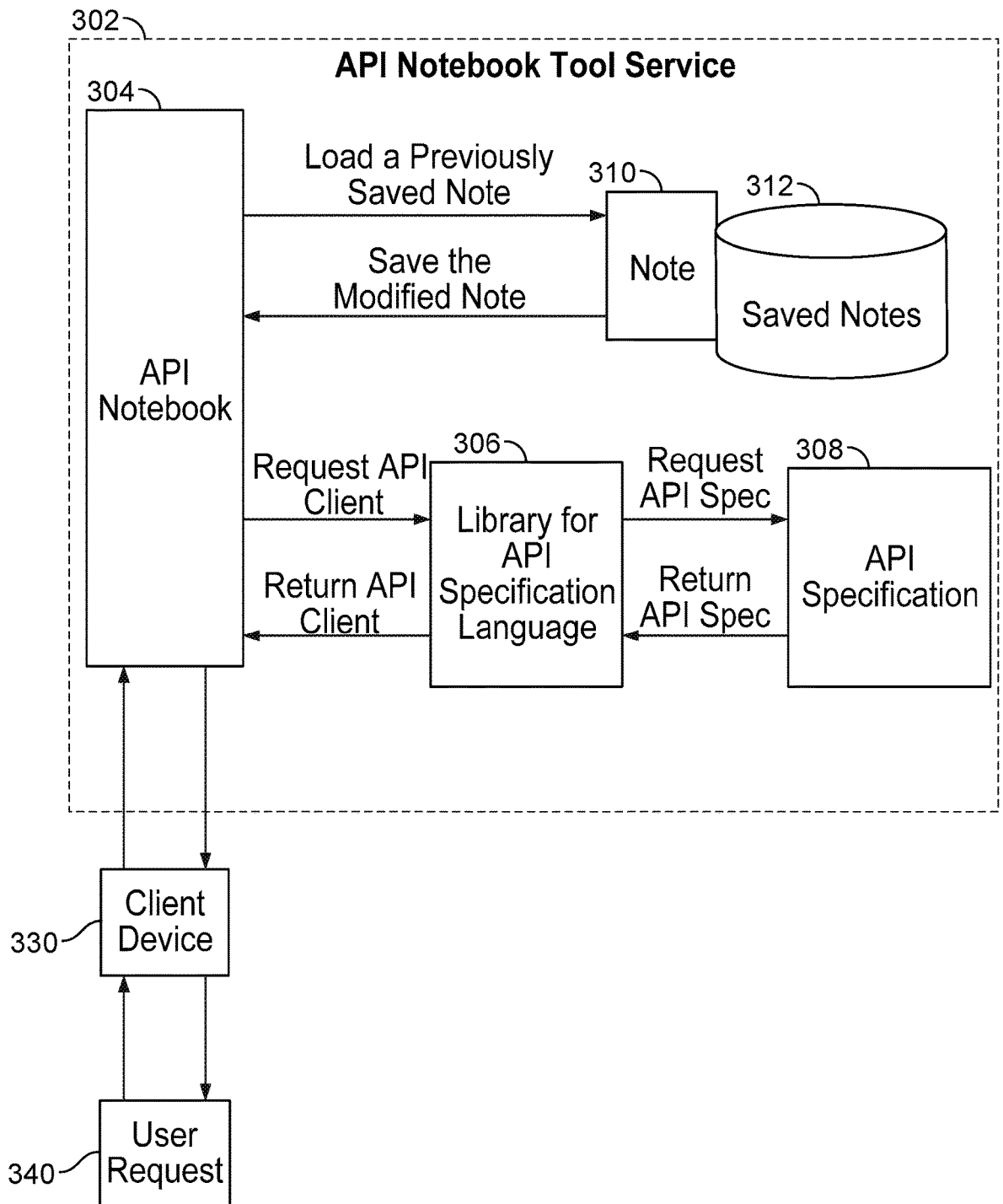
FIG. 3 is a functional diagram illustrating a detailed architecture of a system for providing an API notebook tool service in accordance with some embodiments.

FIG. 3 is a functional diagram illustrating a detailed architecture of a system for providing an API notebook tool service in accordance with some embodiments.

As shown, an API notebook tool service 302 includes an API notebook 304, a library for an API specification language 306 (e.g., using RAML™ or another API specification language), an API specification 308 (e.g., RAML™ or another API specification), a note 310, and a data storage for saved notes 312. For example, API notebook tool service 302 can provide an implementation of API notebook tool 120 as shown in FIGS. 1 and 202 as shown in FIG. 2.

In one embodiment, an architecture for API notebook tool service 302 (e.g., executed on a processor) for facilitating the automatic generation of API clients for developers and the exploration of those APIs via these clients is provided as shown in FIG. 3. As shown in FIG. 3, a user request 340 is communicated via a client device 330 to API notebook 304, such as a request for an API specification. API notebook 304 can then request for the API specification (e.g., for a particular API, such as the Facebook API, Instagram API, Twitter API, or another API) from library for API specification language 306 (e.g., RAML™ API specification or another API specification language). The library can then request the API specification from API specification 308 (e.g., RAML™ or another specification), which then returns the requested API specification to library 306, which returns the requested API specification to API notebook 304 as shown. A user interacting with client device 330 can then view or edit the requested API specification using API notebook 304 (e.g., the notebook engine) to view the API specification, to generate a script or client code for calling the API, and/or to access help information related to the API. Using API notebook 304, a script or client code can be generated for calling the API and the script or client code can be saved by API notebook 304 as a new or modified note that can be stored in saved notes data store 312. In some cases, API notebook 304 communicates with saved notes data store 312 to load a previously saved note, in which notes can be stored in a saved notes data store (e.g., a database or another type of data store).

In one embodiment, the API notebook tool is implemented as a single-page application running entirely within a web browser, using the JavaScript language and DOM built into the browser to create the visual representation for the user, handle the API notebook's operational logic, call out to external services to load RAML and other files and handle API requests and responses, and persist the note. The API notebook can also offer extension points to extend its default functionality. For example, the API notebook can offer by default a capability of reading API notebook contents from a service such as Github gists and writing them back to Github gists, but that functionality can be extended or overridden via an extension point, so that an alternative persistence mechanism can be proved and offered to users. The API notebook can also offer various mechanisms for embedding itself within other web pages or sites and non-web locations such as IDEs. The API notebook can also offer extension points or overridable functionality to allow it to be used for purposes such as automated testing, in which the initial notebook creation can be carried out by a user and/or by an automated notebook generation tool, but subsequent executions of the notebook can be carried out automatically without manual user intervention.

In an example implementation, a Markdown language, such as GitHub Flavored Markdown (GFM) format or another variant of the Markdown language or another formatting syntax language, can be used to implement the notes generated using the API notebook tool, such as shown in FIG. 3. In one embodiment, GitHub is used as a repository for the notes generated using the API notebook tool. In another embodiment, different repositories can be used for storing and sharing notes, using other open collaboration repositories, or using a proprietary created note collaboration repository. In some cases, confidential data can be separately stored for confidentiality purposes. In some implementations, user credentials can be separately stored or not stored (e.g., requiring user entry for executing an API call requiring user credentials, such as by caching such credentials locally at the client) for security purposes.

FIG. 4 is an example screen diagram illustrating a graphical user interface (GUI) of an interface of an API notebook tool in accordance with some embodiments. As an example usage scenario for the API notebook, the user can issue a command within the API notebook to load an API description document (e.g., from a server, web-based hosting service, or other data repository). This file may be an API description written in any format understandable to the API notebook (e.g., that the API notebook is configured to parse and process) or any libraries added to the API notebook, such as an API specification that is compliant with the RESTful API Modeling Language™ (RAML™) or another format. The API notebook can then automatically process that API description to dynamically generate a client for the API, which manifests a Domain Specific Language (DSL) tailored to that API. The user can then use that client to script multiple commands in that DSL that invoke the services exposed by that API, chaining those commands to carry out one or more useful scenarios for using the services exposed by the API. The API notebook can also automatically generate help information for using that client DSL. In some cases, the API notebook can suggest valid API structures and methods, offer to auto-complete the user's typing consistent with the API's capabilities (e.g., once "Music." is typed, the API notebook tool can offer to auto-complete such as "Music.songs" because that's a root resource of the API as shown in FIG. 4), and/or show tooltips and templates for possible valid inputs.

For example, if the API is for a music service, such as the World Music API example shown in FIG. 4, in which songs of various genres can be made available, the DSL can embody the API commands to fetch or load the songs, optionally filtered by genre. In particular, the API notebook can make it easy to use the API in a scripting manner to achieve the desired interaction with the service, in which a first variable (e.g., "genre") can be set to the value of the desired genre; the first variable can then be used to request from the API a list of songs within that genre; the result of the call can be saved in a second variable (e.g., "mySongs"); and the second variable can be further manipulated in the API notebook, as shown in FIG. 4.

In one embodiment, notebooks can include a text cell (e.g., shown as a documentation cell in FIG. 4, which can illustrate any documentation for the API), a code cell (e.g., shown as a code cell in FIG. 4, which can illustrate an example or scripted call to the API), and a results cell (e.g., shown as a results cell in FIG. 4, which can illustrate results from the API call). Code cells are executable blocks of code (e.g., JavaScript or other code) and text cells provide explanation and documentation for the API. In an example implementation, any JavaScript is valid in code cells and any Markdown is valid in text cells. All code cells can be executed by selecting a play button in a toolbar menu. Individual code cells can be executed by pressing return. Such notebooks can be saved to GitHub as gists and can also be shared (e.g., via GitHub and/or by embedding them in a blog or by linking to them).

FIG. 5 is another example screen diagram illustrating a graphical user interface (GUI) of an interface of an API notebook tool in accordance with some embodiments. As another example usage scenario for the API notebook, extending the previous usage scenario, the user can then load another API description file for a different API, in this example, a Facebook API, as shown in FIG. 5. Once again, the API notebook or the libraries that extend it can generate another client, with a DSL custom-tailored to this second API, in this example, the Facebook API. The results of the first API, the World Music API, can then be used in calling the second API, the Facebook API, making it easy for the user to explore how to use these two APIs together. In this example as shown in FIG. 5, the World Music API and the Facebook API can be mashed together to use the song information returned from the World Music API to post the returned song information as a message through the Facebook API. The API notebook tool can also be used to save this coded/scripted client and documentation (e.g., documented usage scenario) as a note, a saved note. This documented usage scenario can also be shared with other users, re-executed by other users, and modified by other users to further extend the scenario (e.g., forking the note to save a new note that provides a different or modified documented usage scenario).

In one embodiment, the API notebook (e.g., also referred to herein as the notebook) includes a user interface in which a user can create short script fragments, which can include one to multiple lines of code, that can be executed by the notebook for testing implementations of clients calling one or more API(s). For example, the scripts can execute any programming constructs made available to them by the notebook, such as basic computation and programming logic, creation and execution of variables and objects and functions, loading of external libraries of functionality, manipulation of the user interface itself (e.g., creating or loading graphics, forms, etc.), and accessing external services that expose APIs.

In one embodiment, the API notebook is constructed within an HTML and JavaScript container, such as a web browser, and uses JavaScript as the language in which scripts can be written and then executed using the API notebook. For example, the API notebook can include a JavaScript software program that can be embedded within a web page or similar HTML/JavaScript container such as a desktop Interactive Development Environment (IDE), along with certain services on a set of servers that allow for persistence, proxying of web service API calls, and collaboration. In other implementations, other languages can be supported, such as Java (e.g., a Java notebook), Python (e.g., a Python notebook), Scala (e.g., a Scala notebook), Google's Go programming language (e.g., a Go notebook), and/or other (scripting) languages.

The API notebook can offer any of a number of interactions (e.g., help) to facilitate creation of these script fragments, such as offered by modern editors and Interactive Development Environments (IDEs). For example, the API notebook can provide for auto-completion, auto-suggestions, tooltip hints, templating, refactoring, jumping to references, outlining, and/or various other interactions that facilitate creation of script fragments to facilitate client generation for interacting with services by calling APIs. In some implementations, the API notebook can suggest snippets and/or suggest prerequisite API calls that facilitate creation of script fragments to facilitate client generation for interacting with services by calling APIs. As an example, to indicate to a developer that prior to calling an API to post an order for a user that a prior API call should be performed to get the user's credit card information, as such is a dependency or prerequisite parameter/requirement for posting the order for the user, such as discussed in the above example.

For example, each script fragment, upon execution, can create and return results that the notebook can display to the user adjacent to the script fragment itself as shown in FIG. 4 (e.g., results cell) and FIG. 5. The display can take various forms, including a results inspector, such as shown in FIG. 4, which allows convenient exploration of the result. In an example implementation, the result inspector can offer collapsed and expanded visual states so as to allow cursory or deep inspection of the results. The API notebook can also offer a capability to refer to those results in other script fragments. As an example, the notebook can offer access to the first result as the variable $0, the second result as the variable $1, and so forth. The notebook can also allow for access to such results when the notebook is accessed by external programs.

In one embodiment, as also illustrated in FIGS. 4 and 5, the API notebook organizes content into cells, including: executable cells that can include script fragments; and result cells that can include results represented by inspectors. For example, the API notebook can also provide documentation cells, in which the user can enter documentation, usually related to the notebook, to specific cells, to specific stages in a workflow, to a particular use case, and/or other related documentation. The contents of each cell can be automatically formatted according to the cell type and the specific contents. For example, executable cells can be formatted appropriately for a language of the script, result cells can be formatted according to the inspector's user interface, and documentation cells can be formatted according to certain conventions (e.g., text syntax formatting). In an example implementation, the API notebook can specify that documentation cells are formatted in the Markdown format, or in HTML, so the user can create documentation using the conventions of Markdown or HTML, respectively.

In one implementation, the API notebook offers any of a number of user interaction capabilities. For example, the notebook can provide graphical interface elements/objects such as menus, tooltips, drag and drop, and controls such as button and expand/collapse toggles (e.g., to allow for additional exploration of APIs, such as by supporting HTML of a web page of controls including forms, drop downs, buttons, and/or other interface elements/objects). The notebook can also support keyboard shortcuts for some actions.

FIG. 6 is another example screen diagram illustrating a graphical user interface (GUI) of an interface of an API notebook tool in accordance with some embodiments. In some implementations, the API notebook tool can suggest snippets and/or suggest prerequisite API calls that facilitate creation of script fragments to facilitate client generation for interacting with services by calling APIs. In this example as shown in FIG. 6, the API notebook tool can be used to facilitate creation of script fragments to facilitate client generation for interacting with the Instagram API. In particular, the API notebook tool can automatically suggest API call data via a drop down menu as shown at 602. For example, as similarly discussed above, providing automated help information associated with the API can include providing automatically suggested data to complete an API call (e.g., an automated complete form of help information), which can be determined based on one or more of the following: most popular and/or most frequently used features of the API to prioritize, which users have which access to features of the API and inform users about restrictions on the API, automatically suggesting prerequisite action (e.g., in order to authenticate which method to call to get data, such as obtaining credit card data before posting an order using the API), etc.

FIG. 7 is another example screen diagram illustrating a graphical user interface (GUI) of an interface of an API notebook tool in accordance with some embodiments. In this example as shown in FIG. 7, the API notebook tool can be used to generate an API client for the Instagram API as similarly discussed above with respect to FIG. 6. As discussed above with respect to FIG. 6, the API notebook tool can automatically suggest values for the API client via a drop down menu as shown at 602 of FIG. 6. In this example as shown at 702 of FIG. 7, the tags object was selected (e.g., instagramApi.tags as shown), and the API notebook tool automatically automated help information associated with the API can include providing automatically suggested data to complete an API call (e.g., an automated complete form of help information), which in this example is shown as the next information that needs to be entered is tagName(tagName), which is a string parameter of the Instagram API that provides a name of the tag.

FIG. 8 is another example screen diagram illustrating a graphical user interface (GUI) of an interface of an API notebook tool in accordance with some embodiments. In this example as shown in FIG. 8, the API notebook tool can be used to generate an API client for the Instagram API as similarly discussed above with respect to FIGS. 6 and 7. As discussed above with respect to FIGS. 6 and 7, the API notebook tool can automatically suggest values for the API client via a drop down menu as shown at 602 of FIG. 6 and as shown at 702 of FIG. 7. In this example as shown at 802 of FIG. 8, the media.recent.get method was entered (e.g., instagramApi.tags.tagName('kittens').media.recent.get as shown), and the API notebook tool automatically automated help information associated with the API can include providing automatically suggested data to complete an API call (e.g., an automated complete form of help information), which in this example is shown as the next information that needs to be entered is get(query?, options?, async?)), which are the parameters for calling this get method of the Instagram API.

In one embodiment, the API notebook includes a set of persistence capabilities. For example, a collection of cells that are saved together can be referred to as a note. The notebook can provide a capability to save the note and retrieve it later (e.g., by storing the note in a saved notes data store, such as shown and discussed above with respect to FIGS. 2 and 3). The notebook can also offer ways to discover and explore saved notes, or notes that have not yet been saved. The notebook can also allow working on multiple notes at once. The notebook can also allow including notes within other notes, directly or by reference, and for creating and persisting groups of notes that are identifiable in some way. In one implementation, a note is embodied in a lightweight Markdown language, such as a GitHub-flavored Markdown document, in which executable cells are fenced code blocks, results cells are markdown blocks denoted in a special way, and documentation cells are any Markdown content between the other types of blocks. In this implementation, a note is also a valid GitHub-flavored markdown document and can therefore be treated as such by other tools and systems that allow for GitHub-flavored Markdown documents.

In one embodiment, the API notebook facilitates publishing and collaboration via notes (e.g., between API developers and API consumers and between multiple developers who are API consumers). For example, notes can be shared with other users, who can view their contents, either directly in whatever persistence format the notebook uses, or by re-instantiating the contents in another instance of the notebook user interface. In the latter case, the notebook can treat that content as another realization of the same document as the original note, so saving it would alter the original document; or it can treat the content as a copy of the original document, in which case saving it would create or modify that separate copy (e.g., a forked version of the note). The notebook can retain information about the relationship of such copies, as well as a history of changes to each copy, including information about the contents of each note such as what external services it accesses. The user who receives access to the note can be offered an opportunity to copy or execute it for themselves with or without persistence, or simply to browse its contents. The contents or executable aspects of the note can also be altered, automatically or through prompting of the user, to customize it for the user. For example, the credentials used within the note's scripts to access external services (e.g., a user's credentials for authenticating with a service, such as Facebook, Instragram, Twitter, or another service) can be set by the notebook to the viewing user's credentials. In one implementation, those credentials are not stored within the contents of the note (e.g., for security reasons), but they may be required by those contents in order to execute the client.

In one embodiment, the API notebook offers extension capabilities to allow its functionality to be extended in various ways. For example, the notebook can provide a plug-in model in which new software modules can be plugged into the notebook to extend its capabilities. The ability to create clients for web service APIs based on a description of such APIs can be a client-generating module that can be plugged into the notebook, either when the notebook is instantiated or on demand at a later time.

In another example extension of the API notebook, there are facilities for replacing with placeholders certain parts of the notebook that should not be in their full form. For example, if a results cell contains confidential information, the notebook can, automatically or via user prompts, replace that content with placeholders that indicate the content that would be there, without compromising confidentiality by including the content itself. The notebook can also offer capabilities to reveal or reference that content without compromising security, for example, by identifying it with tokens that are associated with a more secure storage facility containing the actual contents. The notebook can also offer facilities for managing and interacting with such facilities.

In one embodiment, a particular specialization of the API notebook is to facilitate design and usage of services, in particular, web services that expose APIs. To that end, the notebook can allow discovery of existing services, through mechanisms such as search, browsing of a catalog, or injection of information from a web page that hosts the notebook user interface. The notebook can solicit or receive information about the form of the API, such as a Web Service Definition Language (WSDL) description of a Simple Object Access Protocol (SOAP) based web service, or corresponding descriptions of RESTful web services. The notebook can then automatically generate a client for the service in the language of choice for the notebook, which exposes a Domain Specific Language (DSL) for the service as well as documentation and assistance to the user in interacting with that service. For example, the client can take the form of an object-oriented library for that service, whose objects and methods reflect the specific form of the API exposed by that service, with the auto-completion, tooltip hinting, and templating offered by the notebook having been tailored to that API. The client can also make use of the notebook capabilities for secure storage and user interactions to solicit the information it needs to access the service through its API. That access can be synchronous or asynchronous, and the notebook can offer facilities to manage asynchronous interactions such that the order of execution of cells in the note is more logical and intuitive, without the user having to make special arrangements to account for the asynchronous nature of the API calls. In an API context, the notebook's capabilities to customize its contents and interactions of the user become particularly important, for example, because APIs often require individual authentication and authorization to function. The notebook facilities for persistence and collaboration are also particularly useful in the API context to promote discovery of APIs, proper use of APIs individually and together with other APIs, discovery of new use cases, and analysis of patterns of API engagement and usage.

In one embodiment, an API notebook is extended for testing. For example, the notebook can include a large number of combinations and permutations of resources, methods, and parameters; and the notebook can be extended with an assertion framework (e.g., throw an error if do not get result in the expected form). The notebook can be automatically generated from an API specification so it covers most or all of the API characteristics that should be tested, and the notebook can then be enhanced by a user to cover even more relevant test cases. The notebook can be executed manually (e.g., from a browser) by a user, or it can be executed automatically with or without any user interface (e.g., as part of a continuous integration software development lifecycle). The notebook can also form part of a certification process or test suite, in order to attest to the proper form or functioning of an API.

In one embodiment, the notebook facilitates implementation of APIs that are compliant with the open RAML™ specification. In other embodiments, the notebook facilitates implementation of APIs that are compliant with other API-related specifications and/or requirements, including open and/or proprietary API specifications and/or requirements. RAML related documentation is available at http://raml.org/projects.html, including the RAML specification available at http://raml.org/spec.html, the RAML JavaScript parser available at https://github.com/raml-org/raml-js-parser, and the RAML Java parser available at https://github.com/raml-org/raml-java-parser.

Figure 9:
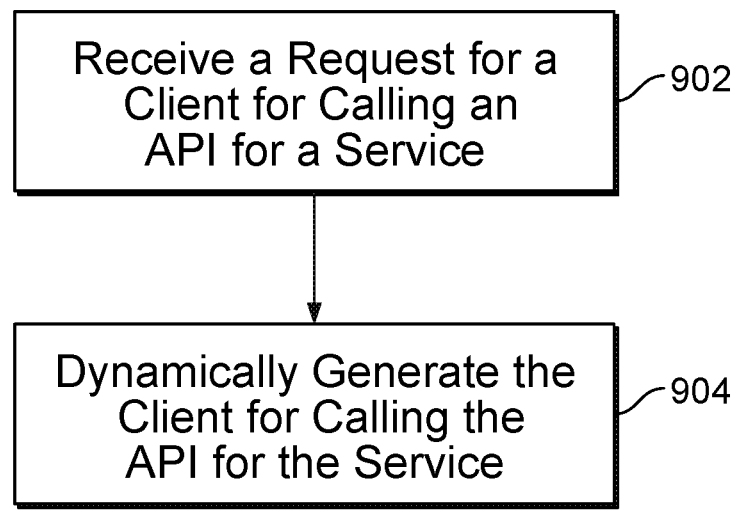
FIG. 9 is a flow diagram illustrating a process for providing an API notebook tool in accordance with some embodiments.

FIG. 9 is a flow diagram illustrating a process for providing an API notebook tool in accordance with some embodiments. In some embodiments, the process for providing an API notebook tool is performed using the API notebook tool system/service, such as described above with respect to FIGS. 1-8. In some implementations, the API notebook tool can be provided as a cloud-based API notebook tool and/or as a plug-in for existing clients to facilitate dynamically generating clients for calling APIs for services based on an API specification.

Referring to FIG. 9, at 902, a request for a client for calling an API for a service is received. For example, the API can be a REST API for remote service, such as a web service or other cloud-based service.

At 904, dynamically generating the client for calling the API for the service is performed. For example, the client for calling the API for the service can be dynamically generated based on an API specification. In an example implementation, the client for calling the API for the service is dynamically generated using an API client generation engine (e.g., using JavaScript DSL for the API).

In one embodiment, the process further includes converting the API into an object model stored as a note in a data store. In an example use case scenario, the client, which can be generated based on the library for the API specification language, can then be embedded into a mobile client application that interacts with the web service by calling the API.

Figure 10:
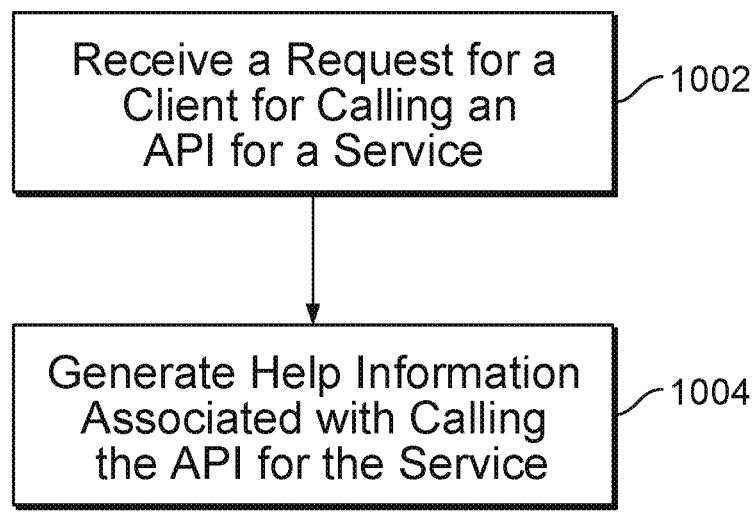
FIG. 10 is another flow diagram illustrating a process for providing an API notebook tool in accordance with some embodiments.

FIG. 10 is another flow diagram illustrating a process for providing an API notebook tool in accordance with some embodiments. In some embodiments, the process for providing an API notebook tool is performed using the API notebook tool system/service, such as described above with respect to FIGS. 1-8. In some implementations, the API notebook tool can be provided as a cloud-based API notebook tool and/or as a plug-in for existing clients to facilitate automated help information associated with calling APIs for services based on an API specification.

Referring to FIG. 10, at 1002, a request for a client for calling an API for a service is received. For example, the API can be a REST API for remote service, such as a web service or other cloud-based service.

At 1004, generating help information associated with calling the API for the service is performed. In some implementations, the help information can include automatically suggesting API call data to provide the help information associated with using the API for the service. For example, providing automated help information associated with the API can include providing automatically suggested data to complete an API call (e.g., an automated complete form of help information), which can be determined based on one or more of the following: most popular and/or most frequently used features of the API to prioritize, which users have which access to features of the API and inform users about restrictions on the API, automatically suggesting a prerequisite action(s) (e.g., in order to authenticate, which method to call to get data, such as obtaining credit card data before posting an order using the API, such as discussed in the above example), etc. As another example, providing automated help information associated with the API can include providing examples to users of API usage insert snippets (e.g., example snippets of other users' business logic to present as examples). As yet another example, providing automated help information associated with the API can include providing a template (e.g., scaffolding) of an application based on the note. Various other examples of help information that can be generated by the API notebook are described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   generating, by an API notebook tool, a client for calling an application programming interface (API) based on an API specification comprising a description of the API;
   converting, by the API notebook tool, the API into a note in a data store comprising a coded implementation of the client and documentation for a documented usage scenario of the API implemented by the client, wherein user credentials for authenticating with the API are cached locally;
   loading, by the API notebook tool, the note from the data store using the API notebook tool; and
   saving, by the API notebook tool, a modified version of the note in the data store using the API notebook tool, wherein the note is shared with a plurality of editors, wherein each of the plurality of editors can execute and/or edit the note to provide for a modified usage scenario of the API, and
   wherein at least one of the generating, converting, loading, and saving are performed by one or more computers.

2. The method of claim 1, further comprising:
   determining, by the API notebook tool, a call to the API based on a partial text input and the API specification by examining most popular used features of the API and/or most frequently used features of the API.

3. The method of claim 1, further comprising:
   receiving, by the API notebook tool, results of an execution of the client; and
   displaying, by the API notebook tool, a result inspector comprising collapsed and expanded visual states.

4. The method of claim 1, further comprising:
   receiving, by the API notebook tool, results of an execution of the client; and
   providing, by the API notebook tool, a capability to refer to the results as a variable in a script fragment.

5. The method of claim 1, further comprising:
   suggesting, by the API notebook tool, a prerequisite action comprising a method identification.

6. The method of claim 1, further comprising:
   implementing, by the API notebook tool, the note in a markdown language.

7. The method of claim 1, wherein the client is embedded into a client application that interacts with a web service by calling the API.

8. A system, comprising:
   a memory; and
   at least one processor coupled to the memory and configured to:
      generate a client for calling an application programming interface (API) based on an API specification in an API notebook tool, wherein the API specification comprises a description of the API;
      convert the API into a note in a data store comprising a coded implementation of the client and documentation for a documented usage scenario of the API implemented by the client, wherein user credentials for authenticating with the API are cached locally;
      load the note from the data store using the API notebook tool; and
      save a modified version of the note in the data store using the API notebook tool, wherein the note is shared with a plurality of editors, and
      wherein each of the plurality of editors can execute and/or edit the note to provide for a modified usage scenario of the API.

9. The system recited in claim 8, the at least one processor further configured to:
   determine a call to the API based on a partial text input and the API specification by examining most popular used features of the API and/or most frequently used features of the API.

10. The system recited in claim 8, the at least one processor further configured to:
    receive results of an execution of the client; and
    display a result inspector comprising collapsed and expanded visual states.

11. The system recited in claim 8, the at least one processor further configured to:
    receive results of an execution of the client; and
    provide a capability to refer to the results as a variable in a script fragment.

12. The system recited in claim 8, the at least one processor further configured to:
    suggest a prerequisite action comprising a method identification.

13. The system recited in claim 8, wherein to convert the API into a note, the at least one processor is further configured to:
   implement the note in a markdown language.

14. The system recited in claim 8, wherein the client is embedded into a client application that interacts with a web service by calling the API.

15. A non-transitory computer-readable device having instructions stored thereon that, when executed by at least one computing device, causes the at least one computing device to perform operations comprising:
   generating a client for calling an application programming interface (API) based on an API specification comprising a description of the API in an API notebook tool;
   converting the API into a note in a data store comprising a coded implementation of the client and documentation for a documented usage scenario of the API implemented by the client, wherein user credentials for authenticating with the API are cached locally;
   loading the note from the data store using the API notebook tool; and
   saving a modified version of the note in the data store using the API notebook tool,
      wherein the note is shared with a plurality of editors,
      wherein each of the plurality of editors can execute and/or edit the note to provide for a modified usage scenario of the API, and
      wherein at least one of the generating, converting, loading, and saving are performed by one or more computers.

16. The non-transitory computer-readable device of claim 15, the operations further comprising:
   determining a call to the API based on a partial text input and the API specification by examining most popular used features of the API and/or most frequently used features of the API.

17. The non-transitory computer-readable device of claim 15, the operations further comprising:
   receiving results of an execution of the client; and
   displaying a result inspector comprising collapsed and expanded visual states.

18. The non-transitory computer-readable device of claim 15, the operations further comprising:
   receiving results of an execution of the client; and
   providing a capability to refer to the results as a variable in a script fragment.

19. The non-transitory computer-readable device of claim 15, the operations further comprising:
   suggesting a prerequisite action comprising a method identification.

20. The non-transitory computer-readable device of claim 15, the operations further comprising:
   implementing the note in a markdown language.

* * * * *